(12) United States Patent
Oh et al.

(10) Patent No.: US 9,036,497 B2
(45) Date of Patent: May 19, 2015

(54) MOBILE VIDEO STREAMING ENHANCEMENT IN A NETWORK CODING-CAPABLE WIRELESS NETWORK

(71) Applicant: SNU R&DB FOUNDATION, Seoul (KR)

(72) Inventors: Ha Young Oh, Seoul (KR); Chong Kwon Kim, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 199 days.

(21) Appl. No.: 13/735,870

(22) Filed: Jan. 7, 2013

(65) Prior Publication Data

US 2014/0196065 A1 Jul. 10, 2014

(51) Int. Cl.
| | | |
|---|---|---|
| *H04N 21/2383* | (2011.01) | |
| *H04N 21/24* | (2011.01) | |
| *H04N 21/61* | (2011.01) | |
| *H04N 21/6379* | (2011.01) | |
| *H04N 21/647* | (2011.01) | |
| *H04L 12/26* | (2006.01) | |

(52) U.S. Cl.
CPC ....... *H04N 21/2383* (2013.01); *H04N 21/2402* (2013.01); *H04N 21/6131* (2013.01); *H04N 21/6379* (2013.01); *H04N 21/64738* (2013.01); *H04N 21/64761* (2013.01)

(58) Field of Classification Search
CPC ..................... H04N 21/44245; H04N 21/2383

USPC .......................................................... 370/252
See application file for complete search history.

(56) References Cited

U.S. PATENT DOCUMENTS

| | | | |
|---|---|---|---|
| 2003/0231655 A1* | 12/2003 | Kelton et al. | 370/468 |
| 2005/0083943 A1* | 4/2005 | Lee et al. | 370/395.4 |
| 2006/0268933 A1* | 11/2006 | Kellerer et al. | 370/469 |
| 2007/0248033 A1* | 10/2007 | Bejerano et al. | 370/318 |
| 2009/0147738 A1* | 6/2009 | Larsson et al. | 370/329 |
| 2010/0086024 A1* | 4/2010 | Zhang et al. | 375/240.02 |
| 2011/0002321 A1* | 1/2011 | Iwai et al. | 370/342 |
| 2012/0092991 A1* | 4/2012 | Jeong et al. | 370/235 |
| 2013/0114446 A1* | 5/2013 | Liu et al. | 370/252 |
| 2013/0128757 A1* | 5/2013 | Chowdhary et al. | 370/252 |
| 2013/0223229 A1* | 8/2013 | Hui et al. | 370/238 |
| 2013/0322277 A1* | 12/2013 | Vanganuru et al. | 370/252 |

\* cited by examiner

*Primary Examiner* — Shripal Khajuria
*Assistant Examiner* — Faisal Choudhury

(57) ABSTRACT

A method of mobile video streaming according to an exemplary embodiment of the present invention includes three parts. The first part is for AP to measure the information of all clients such as ETX (Expected Transmission count metric) and RSSI (Receive Signal Strength Indicator) periodically for long-term channel quality and mobility patterns of each client. In the second part, AP estimates the buffer status, short-term channel quality, and mobility detection of each client based on only feedback from the target client and first part result. And lastly, AP performs a practical online scheduling to select the best network code set satisfying high Peak Signal-to-Noise Ratio (PSNR), a standard metric of video quality, during a GoP (Group of Picture) at all clients based on I-frame priority.

4 Claims, 5 Drawing Sheets

MOBILE VIDEO STREAMING ENHANCEMENT IN A NETWORK CODING-CAPABLE WIRELESS NETWORK

TECHNICAL FIELD

The present invention relates to mobile video streaming, and more particularly, to network coding-based mobile video streaming over unreliable wireless links.

BACKGROUND

In past years, many techniques for the robust media streaming in a network-coding-capable wireless network have been proposed. One is to select the best network code for short-term high quality of video transmission among all possible codes. The other is to maximize long-term high quality of multimedia applications based on the MDP (Markov Decision Process) with a network coding. However, these techniques are infeasible due to the strong assumption of the perfect feedback information such as buffer status of all clients after each transmission of Access Point (AP), fixed clients within one AP and offline algorithms.

SUMMARY

In this disclosure, we propose a practical online scheduling algorithm to suboptimize not only for network throughput but also for mobile video quality with the reliability gain of network coding (NC) over unreliable wireless links.

An exemplary embodiment of the present invention provides a method for mobile video streaming comprising: measuring information of a plurality of clients periodically for long-term channel quality and mobility patterns of each client; estimating buffer status, short-term channel quality, and mobility of each client based on only feedback from a target client; and performing an online scheduling to select a best network code set satisfying high Peak Signal-to-Noise Ratio (PSNR), a standard metric of video quality, during a GoP (Group of Picture) at all of the plurality of clients based on I-frame priority.

It is preferable that the information includes ETX (Expected Transmission count metric) and RSSI (Receive Signal Strength Indicator).

The best network code set may be selected utilizing Eq. (1) and Eq. (4) below.

$$GNC_{p,k,i} = \max_p \max_k Q_{p,k,i} \quad (1)$$

$$= \max_p \max_k \sum_{m=1}^{M} Q_{p,k,i}(c_m)$$

$$= \max_p \max_k \sum_{m=1}^{M} \sum_{p=1}^{n} \left\{ \begin{array}{l} [d_p^k(c_m) \cdot t_p^k(c_m) \cdot (1 - l_p^k) \cdot \Delta_p^k] + \\ [(1 - d_p^k(c_m)) \cdot t_p^k(c_m) \cdot (1 - e_p^k) \cdot \Delta_p^k] \end{array} \right\},$$

for $k = 1, 2, \ldots, 2^n$ $$\text{Maximize} \sum_{\forall i \in AP} GNC_{p,k,i} \quad (4)$$

The estimating short-term channel quality may comprise utilizing the feedback from the target client for updating ETX of the target client as short term channel quality.

The estimating mobility may comprises: predicting the mobility based on each L2 triggers occurred when the calculated RSSI of received beacon is smaller than the predefined RSSI threshold; and calculating possible locations of the target client.

Other features and aspects will be apparent from the following detailed description, the drawings, and the claims.

DETAILED DESCRIPTION OF EMBODIMENTS

Figure 1:
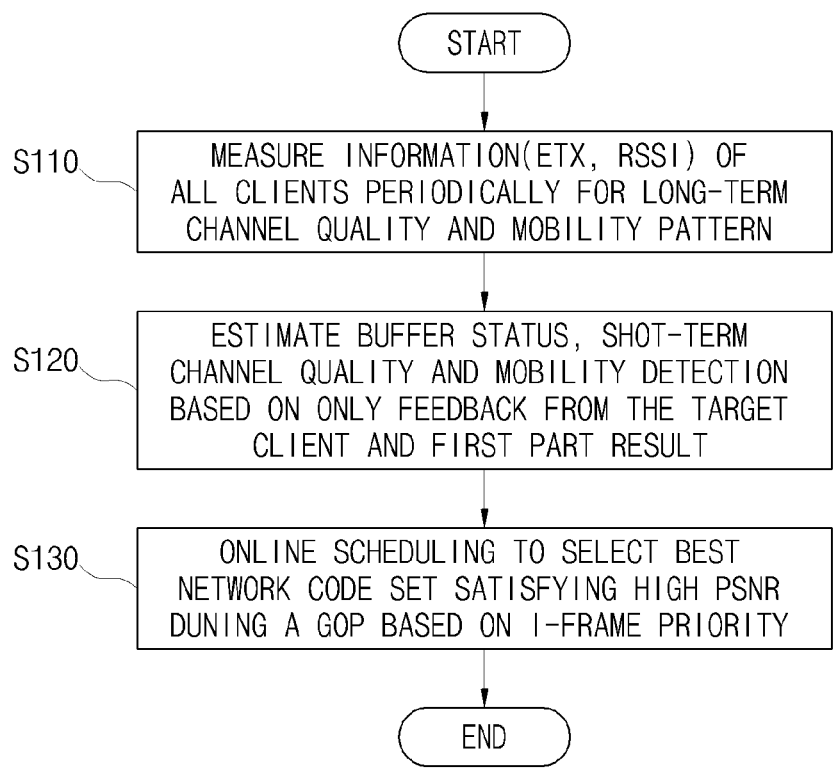
FIG. 1 is a flowchart of a method of mobile video streaming according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Now, a network coding-based mobile video streaming over unreliable wireless links according to an exemplary embodiment of the present invention is described with reference to accompanying drawings.

FIG. 1 is a flowchart of a method of mobile video streaming according to an exemplary embodiment of the present invention.

As shown in FIG. 1, a method of mobile video streaming according to an exemplary embodiment of the present invention includes three parts. The first part is for AP to measure the information of all clients such as ETX (Expected Transmission count metric) and RSSI (Receive Signal Strength Indicator) periodically for long-term channel quality and mobility patterns of each client (S110). In the second part, AP estimates the buffer status, short-term channel quality, and mobility detection of each client based on only feedback from the target client and first part result (S120). And lastly, AP performs a practical online scheduling to select the best network code set satisfying high Peak Signal-to-Noise Ratio (PSNR), a standard metric of video quality, during a GoP (Group of Picture) at all clients based on I-frame priority (S130).

Figure 2:
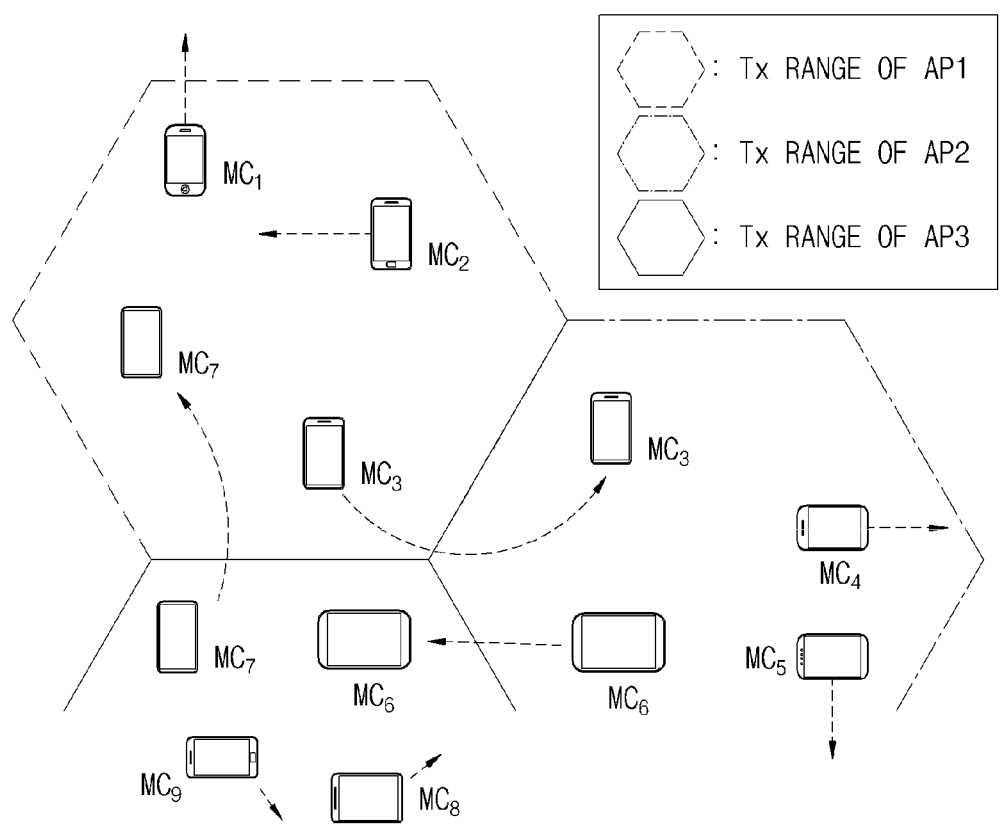
FIG. 2 shows implementation environment of performance evaluation for a method of mobile video streaming according to an exemplary embodiment of the present invention.

In a downlink scenario with arbitrary number of APs and MCs, as illustrated in FIG. 2, a method of mobile video streaming according to an exemplary embodiment of the present invention provide a practical online scheduling algorithm.

Each AP selects the best network code online-manner by estimating the buffer status, short-term channel quality and mobility detection at all MCs within the transmission range of each AP. The best among a different set of candidate network codes is to achieve the maximum throughput improvement, and potentially the maximum mobile video quality depending on the importance and urgency of all packets. To describe the remaining components and functions of the system, the terminology is summarized in Table I.

TABLE I

TERMINOLOGY

| Variable | Value | Meaning |
| --- | --- | --- |
| $d_p^k(c_m)$ | 1 | $k_{th}$ network code including packet p is decodable at client $c_m$. |
|  | 0 | Otherwise. |
| $t_p^k(C_m)$ | 1 | packet p included in $k_{th}$ network code is targeted to client $c_m$. |
|  | 0 | Otherwise. |

| Symbol | Meaning |
| --- | --- |
| $GNC_{p,k,i}$ | GoP-aware $k_{th}$ network code including packet p at AP i |
| $Q_{p,k,i}$ | The contribution of $k_{th}$ network code including packet p to the video quality when AP i broadcast it to all clients |
| $l_p^k$ | The loss probability of packet p due to time-out, wireless channel error, or mobility prediction error |
| $e_p^k$ | The undecodable probability of packet p due to ETX probing time-out or estimation error |
| $\Delta_p^k$ | The improvement in video quality (PSNR) if packet p is received and on time at client |
| $c_m$ | $m_{th}$ mobile client |
| $\tau$ | The remaining time until the play-out deadline |
| $f(t)$ | The distribution of the forward-trip time |
| $p_c(t)$ | The wireless channel error probability due to noise, fading, and interference |
| $p_m(t)$ | The transmission error probability due to the wrong prediction of the client mobility |
| $p_f(t)$ | The estimating error probability of the client buffer status |
| $\sigma$ | The remaining time until periodic next ETX probing |
| $r(t)$ | The distribution of the forward and reverse trip time |

Each AP will construct and broadcast the best network code $GNC_{p,k,i}$ (GoP-aware Network Coding), which consists of the packet p of I-frame XOR-ed together with some other packets and is kth network code set at AP i. It is given by the following Eq. (1).

$$GNC_{p,k,i} = \max_p \max_k Q_{p,k,i} \quad (1)$$

$$= \max_p \max_k \sum_{m=1}^{M} Q_{p,k,i}(c_m)$$

$$= \max_p \max_k \sum_{m=1}^{M} \sum_{p=1}^{n} \left\{ \begin{array}{l} [d_p^k(c_m) \cdot t_p^k(c_m) \cdot (1-l_p^k) \cdot \Delta_p^k] + \\ [(1-d_p^k(c_m)) \cdot t_p^k(c_m) \cdot (1-e_p^k) \cdot \Delta_p^k] \end{array} \right\},$$

for $k = 1, 2, \ldots, 2^n$

After defining the contribution of $k_{th}$ network code including packet p to the video quality of a single node $c_m$ at AP i during a GoP, $Q_{p,k,i}$ (Cm), we define the total video quality improvement of network code as the sum of the video quality improvements at all clients $c_m=1, \ldots M$, due to network code $Q_{p,k,i}$. In general network coding, a target client $c_m \in M$ can decode the network code and obtain wanted packet p. For this to be guaranteed, all other packets except the packet p must be among the packets that are already overheard at the target client $c_m$. In the exemplary embodiment of the present invention, we also utilize the undecodable packets at each client because they can be useful for decoding another network code. Namely, the first part at the back of the Eq. (1) describes the decodable case of the network code at the target client $c_m$. After decoding the network code, the improvement in video quality (PSNR) $\Delta_p^k$ is calculated at client considering the loss probability $l_p^k$. The second part at the back of the Eq. (1) describes the undecodable case of the network code at the target client $c_m$ considering the undecodable probability $e_p^k$. Therefore, depending on the set $\pi$ of the n packets at AP, the network code candidates are $2^n$.

To compute $\Delta_p^k$, we decode the corresponding GoP with this packet missing and we compute the resulting distortion with online-manner. Eq. (2) and Eq. (3) show the loss probability $l_p^k$ and the estimating error probability $e_p^k$, respectively.

$$l_p^k = \int_\tau^\infty f(t)dt + (1 - \int_\tau^\infty f(t)dt) \cdot (p_c(t) + p_m(t)) \quad (2)$$

$$e_p^k = \int_\sigma^\infty r(t)dt + (1 - \int_\sigma^\infty r(t)dt) \cdot p_f(t) \quad (3)$$

Our objective function is to maximize Eq. (1) about all APs given in Eq. (4).

$$\text{Maximize: } \sum_{\forall i \in AP} GNC_{p,k,i} \quad (4)$$

Whenever the target client receives the network code, it can only send the feedback to AP whether it can receive the network code or not. And then AP estimates what the clients have received after comparing ETXs of other clients with that of the target client. Namely, AP guesses the clients with lower ETX than the target client also have received the packet p while the clients with higher ETX than that have not received the packet p. In addition, AP utilizes the feedback from the target client for updating ETX of the target client as short term channel quality. The proposed scheme also predicts the clients mobility based on each L2 triggers occurred when the calculated RSSI (Receive Signal Strength Indicator) of received beacon is smaller than the predefined RSSI threshold. Based on that, AP calculates the possible locations of the target client when they move according to Random Walk Model mobility model with 2 m/s. It has total 9 states with the combination of each x and y states and each state means the direction (i.e. north, south, east, west, north-east, north-west, south-east, south-west and stay). Each state changes to the next state according to the given transition probability. We exemplify the client located in the outskirts of the transmission range of AP. This area is part out of link going down range of the transmission range of AP. The client randomly chooses one of initial 9 states with the same probability. And then the clients change to one of 4 next states according to each initial state. We assume that inner transmission range of AP is previous location of the client and AP predicts the client moves to outer transmission range of AP at once. In this case, let us say that AP predicts the client mobility correctly as the client will really move to outer transmission range of AP and otherwise it will fail.

The proposed scheme utilizes partial information from the target client and estimates the additional information about the rest of the clients. To achieve suboptimal solution, we give theoretical analysis with POMDP (Partially Observable Markov Decision Process) on how good the solution can achieve compared with optimal solution SNC based on MDP (Markov Decision Process). To model our proposed scheme with POMDP, we define the set of states S, the set of actions A, the immediate reward $r(s_t, a_t)$, the transition probabilities $P(s_{t+1}|s_t, a_t)$, and the cumulative rewards at each time epoch t. If there are M clients and N packets at any given time slot, state S is represented by an M×N matrix, $S=[a_{i,j}]_{M \times N}$, with binary entries $a_{i,j} \in \{0,1\}$. $a_{i,j}=1$ indicates the presence of packet $p_i$ at client $c_j$, whereas $a_{i,j}=0$ indicates otherwise. Possible actions by AP are the following: 1) Broadcast any packet; 2) broadcast any XOR packet; and 3) broadcast nothing. In case of the transition probability, we consider the Bernoulli model with packet loss probability at each client $c_m$. Therefore, there is an associated transition probability matrix for each action. The immediate reward $r(s_t, a)$ for each pair of a state and an action must be chosen such that the sum of these immediate rewards accurately models our objective. Since our objective is to optimize the quality of multimedia streaming applications, we model the immediate rewards as the PSNR sum by selecting the best network code $GNC_{p,k,i}$ for one or more receivers. In our setting, we know the explicit reward amount $r(s', s)$ when the system moves from state s to state s'. Namely, we can compute $r(s_t, a_t)$ as the expected immediate reward by taking action a as $$r(s_t, a_t) = \sum_{s' \in S} P(s'_{t+1}|s_t, a_t) r(s'_{t+1}, s_t) \quad (5)$$

And we can get the cumulative rewards by using policy π, a sequence of actions at every time step, in Eq. (6).

$$R_j^\pi(s_j) = E_{s_j}^\pi \left\{ \sum_{j=t}^{T-1} r_j(s_j, a_j) + r_T(s_T) \right\} \quad (6)$$

Finally, the optimal policy $$\pi^* = \underset{a \in A}{\operatorname{argmax}} R_j^\pi(s_j)$$

can be solved using the Backward Induction Algorithm (BIA) to produce the maximum final cumulative reward.

We implement GNC and the other schemes (no network coding, network coding optimized in terms of video quality and network throughput as in "Sachin Katti, et al., 'XORs In The Air: Practical Wireless Network Coding,' IEEE/ACM Transaction on Networking, 2008," FNC, and SNC) with Android, a mobile device platform built on the Linux kernel version 2.6.

We consider a downlink topology with three fixed APs and nine MCs as shown in FIG. 2. Each hexagon expresses each AP's transmission (Tx) range with radius 90 m and AP is placed in the center of the hexagon. MCs can move either in an AP's transmission range or between different AP's transmission range and they are the only ones using the downlink, hence there is no congestion. However, packets may still be lost due to errors on the wireless channel, MCs mobility and can also experience a random MAC propagation delay, 2 ms on average. The one-way delay budget for this single-hop is set to 50 ms. We also performed implementations for different number of MCs (N:3-10) including AP and MCs. The MAC scheme is basically the one introduced in "Android Develop: http://developer.android.com." We implement a wide range of effective packet loss rates from 1% up to 20%. The effective loss rate depends on the use of retransmissions, FEC and it is implemented by socket error on the Linux kernel of Android.

We used standard sequences: Carphone, Foreman, Mother & Daughter, Claire, Coastguard, News, Grandma, Akiyo and Salesman. These were QCIF sequences encoded using the JM 8.6 version of the H.264/AVC codec. All encoded sequences had data rate 70 kbps and frame rate 30 fps. As a performance measure for the video quality of an encoded sequence, we use the average PSNR.

Figure 3:
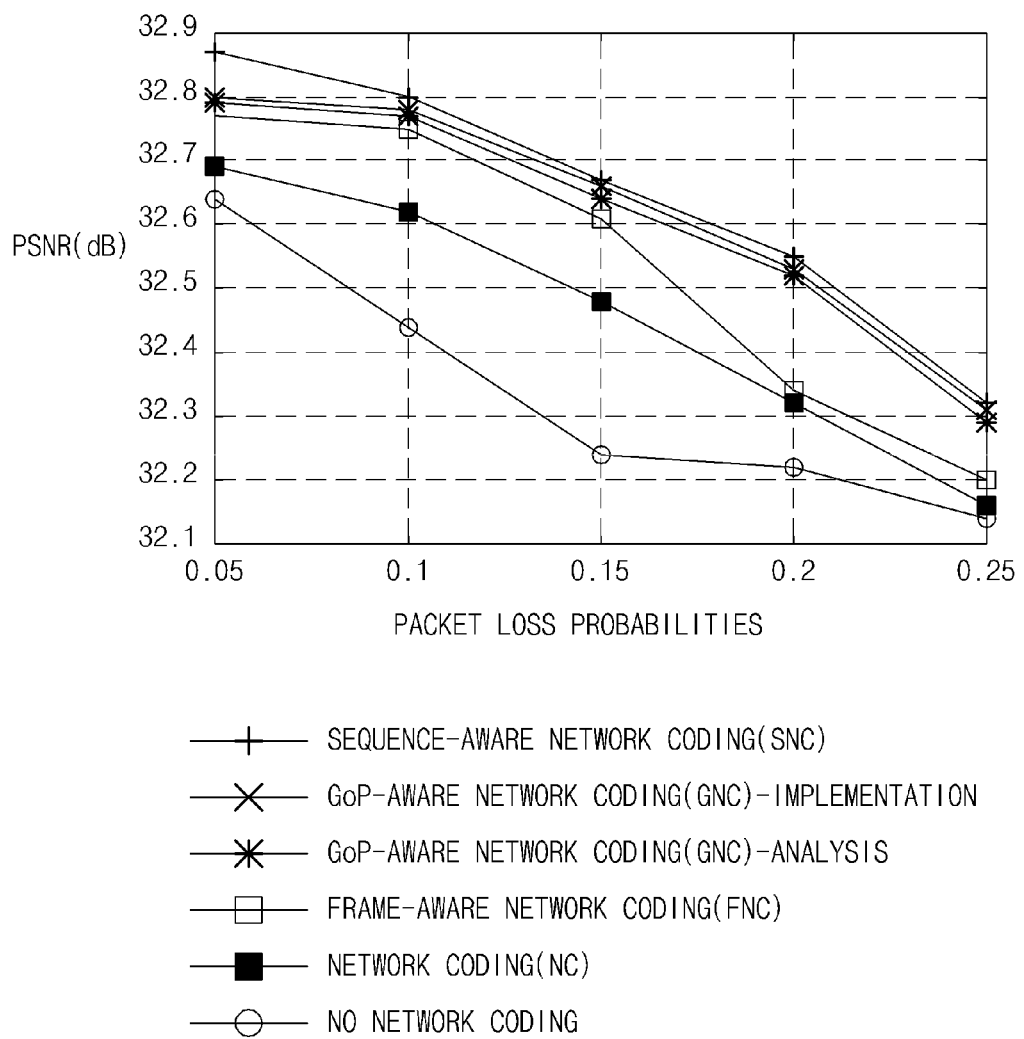
FIG. 3 is a graph showing PSNR with packet loss probabilities.
Figure 4:
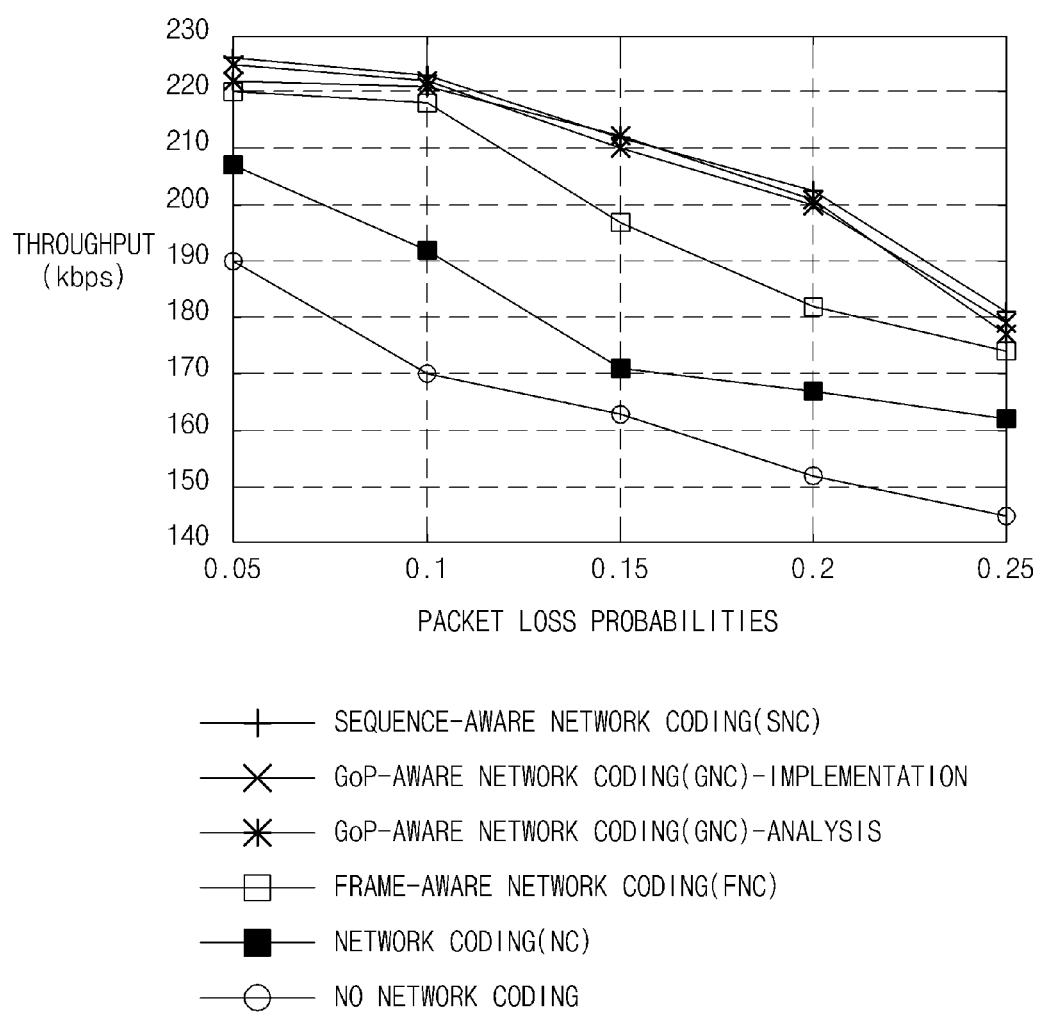
FIG. 4 is a graph showing throughput with packet loss probabilities.
Figure 5:
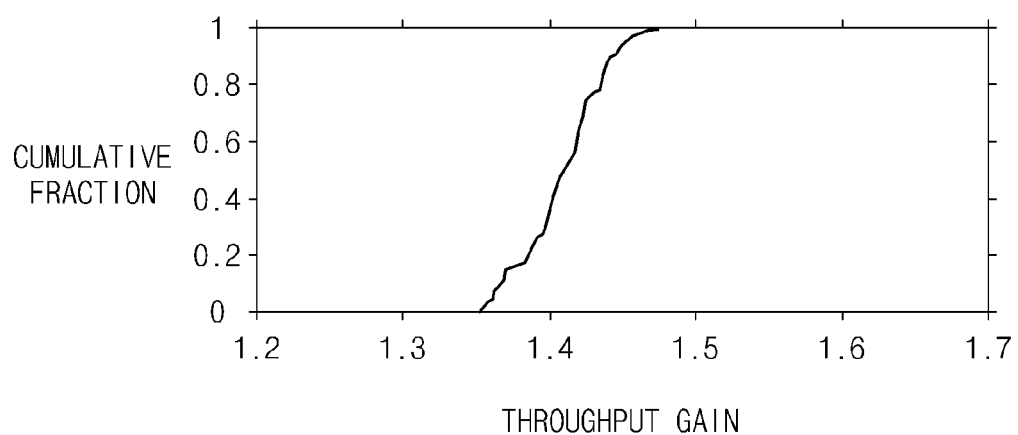
FIG. 5 is a graph showing CDF of throughput gain with a method of mobile video streaming according to an exemplary embodiment of the present invention.

Implementation results show that GNC can significantly improve video quality and application-level throughput, without compromising MAC-level throughput as much as SNC as shown FIGS. 3 and 4. Namely, GNC closely approximates the optimal solution of SNC in terms of both PSNR and throughput. Specifically, our proposed scheme is better than other schemes for a large number of MCs because it can reduce the feedback overhead from the MCs. FIG. 5 shows CDF of throughput gain with the proposed scheme, GNC when the number of MC is 15. And from the computational perspective, time complexity of FNC and SNC is $O(2^{M \times N})$ since they should record all information for each pair of an MC and packets whereas that of GNC is $O(2^N)$ only considering the information of the target MC.

As described above, we proposed a practical online scheduling algorithm to suboptimize not only for network throughput but also for mobile video quality with the reliability gain of network coding (NC) over unreliable wireless links.

The contribution of this disclosure include the following: 1) feedback overhead reduction: AP estimates the buffer information of each mobile client (MC) 2) mobile video streaming support: AP predicts client mobility based on RSSI 3) multiple APs environment 4) a practical online scheduling algorithm.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for mobile video streaming comprising:
    measuring information of a plurality of clients periodically for long-term channel quality and mobility patterns of each client;
    estimating buffer status, short-term channel quality, and mobility of each client based on only feedback from a target client; and
    performing an online scheduling to select a best network code set satisfying high Peak Signal-to-Noise Ratio (PSNR), a standard metric of video quality, during a GoP (Group of Picture) at all of the plurality of clients based on I-frame priority, wherein selecting the best network code set includes selecting a best network code set by maximizing a GoP aware network code for all access points, the GoP aware network being defined as follows:

$$GNC_{p,k,i} = \max_p \max_k Q_{p,k,i} \quad (1)$$

$$= \max_p \max_k \sum_{m=1}^{M} Q_{p,k,i}(c_m)$$

$$= \max_p \max_k \sum_{m=1}^{M} \sum_{p=1}^{n} \left\{ \begin{array}{l} [d_p^k(c_m) \cdot t_p^k(c_m) \cdot (1 - l_p^k) \cdot \Delta_p^k] + \\ [(1 - d_p^k(c_m)) \cdot t_p^k(c_m) \cdot (1 - e_p^k) \cdot \Delta_p^k] \end{array} \right\},$$

for $k = 1, 2, \ldots, 2^n$, where GNC is the GoP aware network code, $Q_{p,k,i}$ is a contribution of k network codes using packets p to a video quality when an access point broadcasts to all clients, $c_m$ is a mobile client, $d_p^k(c_m)$ is whether a network code is decodable at a client, $t_p^k(c_m)$ is whether a packet included in a network code is targeted to a client, $l_p^k$ is a loss probability of a packet due to a time out, $e_p^k$ is an undecodable probability of a packet, and $_p^k$ is an improvement in video quality when a packet is received at a client.

2. The method of claim 1, wherein the information includes ETX (Expected Transmission count metric) and RSSI (Receive Signal Strength Indicator).

3. The method of claim 2, wherein the estimating short-term channel quality comprises utilizing the feedback from the target client for updating ETX of the target client as short term channel quality.

4. The method of claim 2, wherein the estimating mobility comprises:
  predicting the mobility based on each L2 triggers occurred when the calculated RSSI of received beacon is smaller than the predefined RSSI threshold; and
  calculating possible locations of the target client.

* * * * *